(12) United States Patent
Brachos et al.

(10) Patent No.: US 8,071,008 B1
(45) Date of Patent: Dec. 6, 2011

(54) COMPOSITE FORMING TECHNOLOGY

(75) Inventors: Vasilios Brachos, North Andover, MA (US); Vincent Borbone, Sandown, NH (US); Paul Crowther, Bradford, MA (US); Gary Robblee, Wilmington, MA (US)

(73) Assignee: Ceradyne, Inc., Costa Mesa, CA (US)

( * ) Notice: Subject to any disclaimer, the term of this patent is extended or adjusted under 35 U.S.C. 154(b) by 0 days.

(21) Appl. No.: 12/413,127

(22) Filed: Mar. 27, 2009

Related U.S. Application Data

(60) Provisional application No. 61/039,899, filed on Mar. 27, 2008.

(51) Int. Cl.
*B29C 43/52* (2006.01)

(52) U.S. Cl. ........ 264/322; 264/345; 264/347; 264/348; 264/234; 264/236

(58) Field of Classification Search .......... None
See application file for complete search history.

(56) References Cited

U.S. PATENT DOCUMENTS

| 4,613,535 A | 9/1986 | Harpell et al. |
| 4,737,402 A | 4/1988 | Harpell et al. |
| 5,190,809 A | 3/1993 | Marissen et al. |
| 5,527,414 A * | 6/1996 | Dublinski et al. ............ 156/245 |
| 6,048,486 A | 4/2000 | Fels et al. |
| 2007/0141318 A1* | 6/2007 | Balthes ...................... 428/293.4 |
| 2007/0180982 A1* | 8/2007 | Dagher et al. ............... 89/36.02 |

FOREIGN PATENT DOCUMENTS

| EP | 356930 A2 * | 3/1990 |
| WO | WO 9501248 A1 * | 1/1995 |

* cited by examiner

*Primary Examiner* — Christina Johnson
*Assistant Examiner* — Xue Liu
(74) *Attorney, Agent, or Firm* — Grossman Tucker Perreault & Pfleger PLLC

(57) ABSTRACT

A system, machine and method of forming a composite structure. The composite may be placed between a first mold half and a second mold half and heated at a first temperature, $T_1$, and held at a first pressure, $P_1$, wherein the first pressure is applied to the structure through the first and second mold halves. In addition, the composite may be cooled at a second temperature, $T_2$, and held at a second pressure, $P_2$, wherein the second pressure is applied to the composite through the first and second mold halves, wherein $T_1 > T_2$ and $P_1 < P_2$. The composite may also be removed from the first and second mold halves, wherein the composite has a near-net shape.

6 Claims, 16 Drawing Sheets

COMPOSITE FORMING TECHNOLOGY

CROSS REFERENCES TO RELATED APPLICATIONS

This application claims the benefit of U.S. Provisional Application No. 61/039,899, filed on Mar. 27, 2008, which is incorporated herein by reference.

FIELD OF THE INVENTION

The present invention relates generally to a process, machine and system for the formation of composites items and, in particular, a process for producing ballistic composites, such as helmets.

BACKGROUND

Composite structures may be understood as relatively solid materials or structures that may be composed of one or more substances, wherein the various substances may impart different properties to the composite. For example, composite structures may include multiple layers of the same or different materials bound together by an adhesive. Composite structures may be made by a number of methods, such as compression molding, resin transfer molding, spray-up, hand lay-up, sandwich composites, etc. However, some of these processes may be somewhat time and/or labor intensive.

Currently, helmets used for ballistic protection may be molded by compression type processes. Relatively high pressure may be used in the process to adhere the layers placed in the molds with the resin material and trim the helmet to its final shape while being molded, demanding tooling that exhibits relatively high hardness, which may be costly to produce. In this way, the tools may be designed to accommodate maybe only one product line. Furthermore, the cycle time for forming a helmet may be relatively long, such as up to 1 hr depending on the resin material used.

SUMMARY OF THE INVENTION

An aspect of the present disclosure relates to a method of forming a composite structure. The method may include placing a composite between a first mold half and a second mold half and heating the composite at a first temperature, $T_1$, and holding the composite at a first pressure, $P_1$, wherein the first pressure is applied to the composite through the first and second mold halves. The method may also include cooling the composite at a second temperature, $T_2$, and holding the composite at a second pressure, $P_2$, wherein the second pressure is applied to the composite through the first and second mold halves, wherein $T_1 > T_2$ and $P_1 < P_2$. In addition, the method may include removing the composite from the first and second mold halves, wherein the composite may have a near-net shape.

Another aspect of the present disclosure relates to a system for forming a composite structure. The system may include a first mold half and a second mold half as well as a pre-form carrier including a die defining a cavity, wherein the pre-form carrier may be removably affixable to one of the mold halves and may be placed over at least a portion of at least one of the mold halves. The system may also include a rotary transfer station supporting at least one of the first and second mold halves, a first press including a first set of platens and a heating element for providing heat and pressure to the first and second mold halves, and a second press including a second set of platens and a cooling element for providing cooling and pressure to the first and second mold halves.

A further aspect of the present disclosure relates to a machine for forming a composite structure. The machine may include a first mold half and a second mold half, as well as a rotary transfer station supporting at least one of the first and second mold halves, rotatable around a first axis. In addition, the machine may include a clamp for translationally positioning the second mold half relative to the first mold half, a first press including a first set of platens and a heating element for providing heat and pressure to the first and second mold halves, and a second press including a second set of platens and a cooling element for providing cooling and pressure to the first and second mold halves. Further, the machine may include a demolding tool for demolding one of the first and second mold halves.

BRIEF DESCRIPTION OF THE DRAWINGS

The above-mentioned and other features of this disclosure, and the manner of attaining them, will become more apparent and better understood by reference to the following description of embodiments described herein, taken in conjunction with the accompanying drawings, wherein.

DETAILED DESCRIPTION

Figure 1:
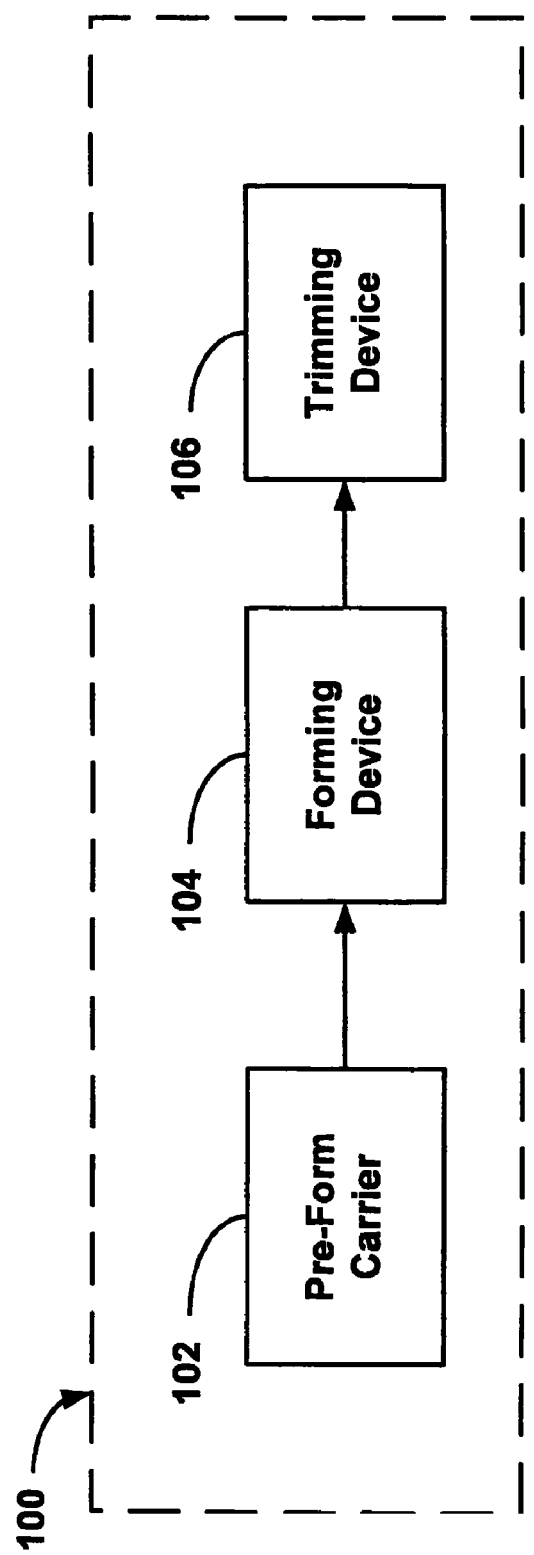
FIG. 1 is an example of a system used herein for providing a composite.

It is to be understood that this disclosure is not limited in its application to the details of construction and the arrangement of components set forth in the following description or illustrated in the drawings. The embodiments herein are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The present disclosure relates to a process, machine and system for forming ballistic composites. In one example, the ballistic composite may be a helmet; however, other composites may be produced as well, including plates. Furthermore, the composite structures may be used in applications other than ballistics, such as safety equipment, construction materials, etc. A composite may be understood herein as a material composition including or limited to one or more materials. In one example, the composite may include layers of a single material that may be oriented in different directions, imparting different properties in the various layers. In another example, the composite may include a first material exhibiting a first set of properties and a second material exhibiting a second set of properties, wherein the first set of material properties may be different from the second set of material properties.

In some examples, the composite structure may be formed by a system or a number of processes, wherein the composite may be pre-formed, consolidated and/or trimmed. An example of such a system is illustrated in FIG. 1. The system 100 may include a pre-forming carrier 102, a forming device 104 and/or a cutting device 106. The forming device may be combined or integrated into the system with the pre-forming carrier and/or the cutting device, wherein an example of a forming device may include a series of stations for loading or unloading the composite material and providing thermal energy and or mechanical energy to the composite.

Figure 2A:
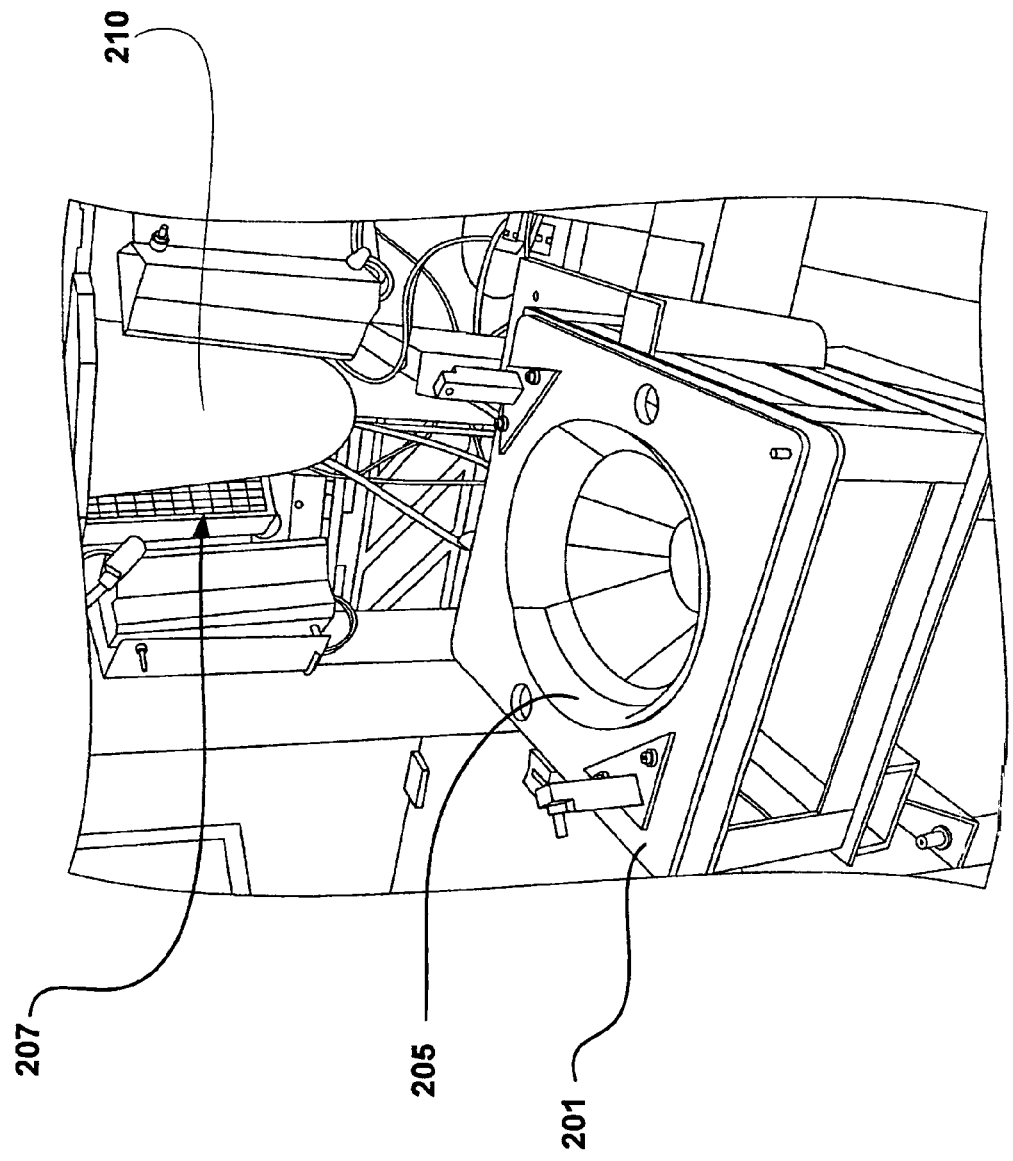
FIGS. 2a and 2b include examples of carrier trays, pre-forms and a ram press.

A composite may be formed, using the system above, by assembling into a stack, layers of the material forming the composite pre-form. The layers may be placed into a pre-forming carrier, an example of which is illustrated in FIGS. 2a and b. The carrier 201 may include a die defining a cavity 203 which may approximate the shape of the mold used in forming and may be placed over at least a portion of the mold, being removably attachable to at least a portion of the mold. As illustrated, the die cavity may be in the general form of a helmet. However, other die configurations may be utilized as well, such as dies for forming armor, armor inserts, shields, other types of head gear, sporting equipment, etc. The die may be formed from a relatively low density material, including materials having a density of 1 to 20 grams per cubic centimeter, including all values and increments therein, such as 2 to 10 grams per cubic centimeter. In some examples, the die may be formed from aluminum, copper, brass, nickel, steel, stainless steel, as well as combinations and/or alloys thereof.

Figure 2B:
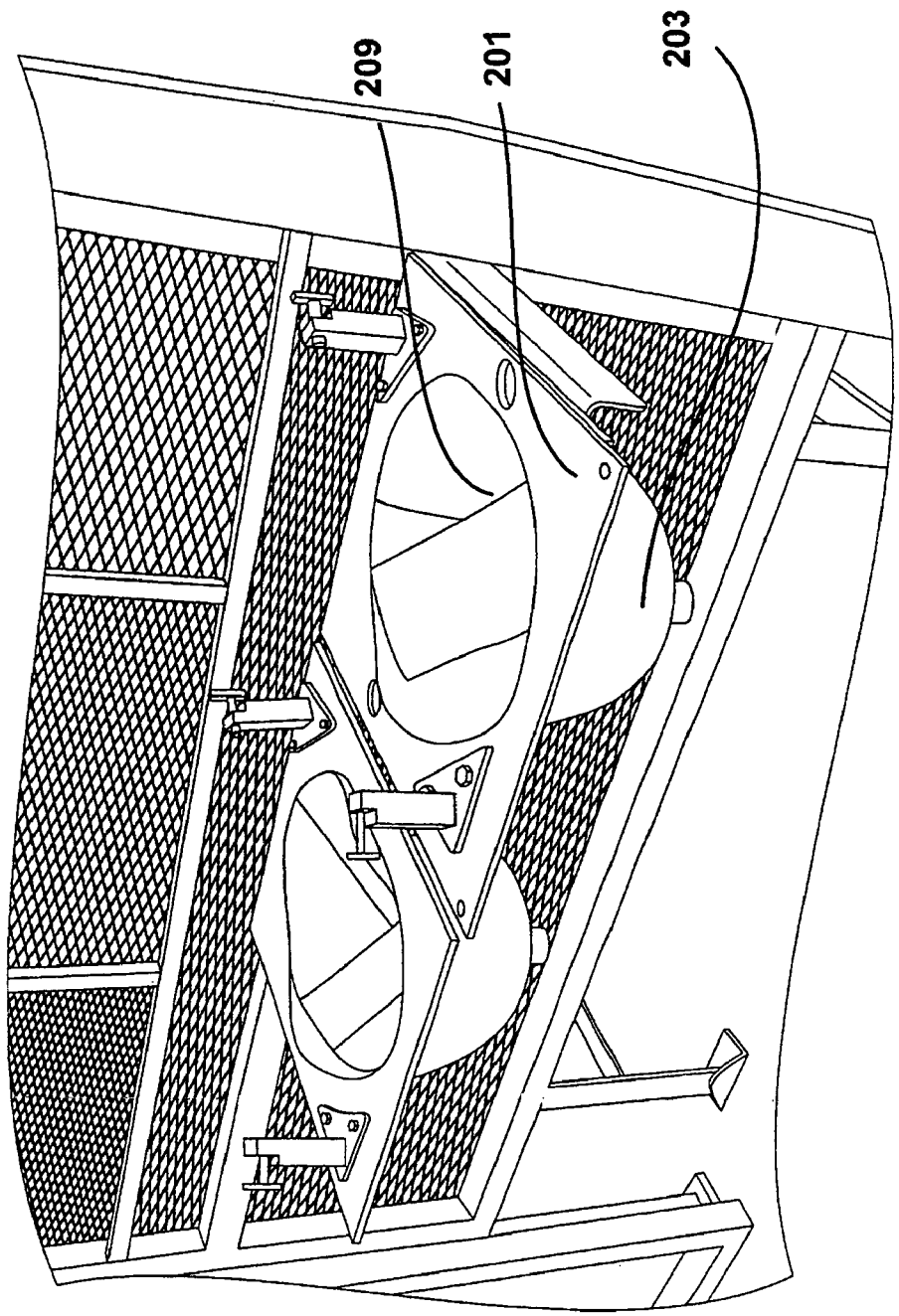

The various layers 205 of the composite may be positioned into the cavity and forced into the die cavity 203 by hand or by a press 207, as illustrated in FIG. 2a, which may press the various layers against at least a portion of the cavity wall and form a pre-form 209, illustrated in FIG. 2b, at an initial pressure $P_{initial}$ and at an initial temperature $T_{initial}$ over an initial time period $t_{initial}$. The press may include a ram press, which may have a conformable mold 210. A conformable mold may be understood as a mold formed from a relatively deformable composition, such as foam, rubber or other compositions. The conformable mold may, for example, exhibit a first set of dimensions and, upon the addition of pressure, may exhibit a second set of dimensions. In some examples, the conformable mold may exhibit a compression strength at 10% deflection in the range of 10 to 10,000 psi, including all values and increments therein, such as 10 to 100 psi, 100 to 1,000 psi, 1,000 to 5,000 psi, etc. As may be appreciated, the compression strength of the mold may be selected based upon the deformability or stiffness of the composite layers. The pre-form 209 may approximate the shape of the mold used during the forming process and to some extent may approximate the shape of the final product. It may be appreciated that the use of the pre-forming carrier may be optional. In another example vacuum may be used between the conformable mold on the ram and the preforming carrier.

Figure 3:
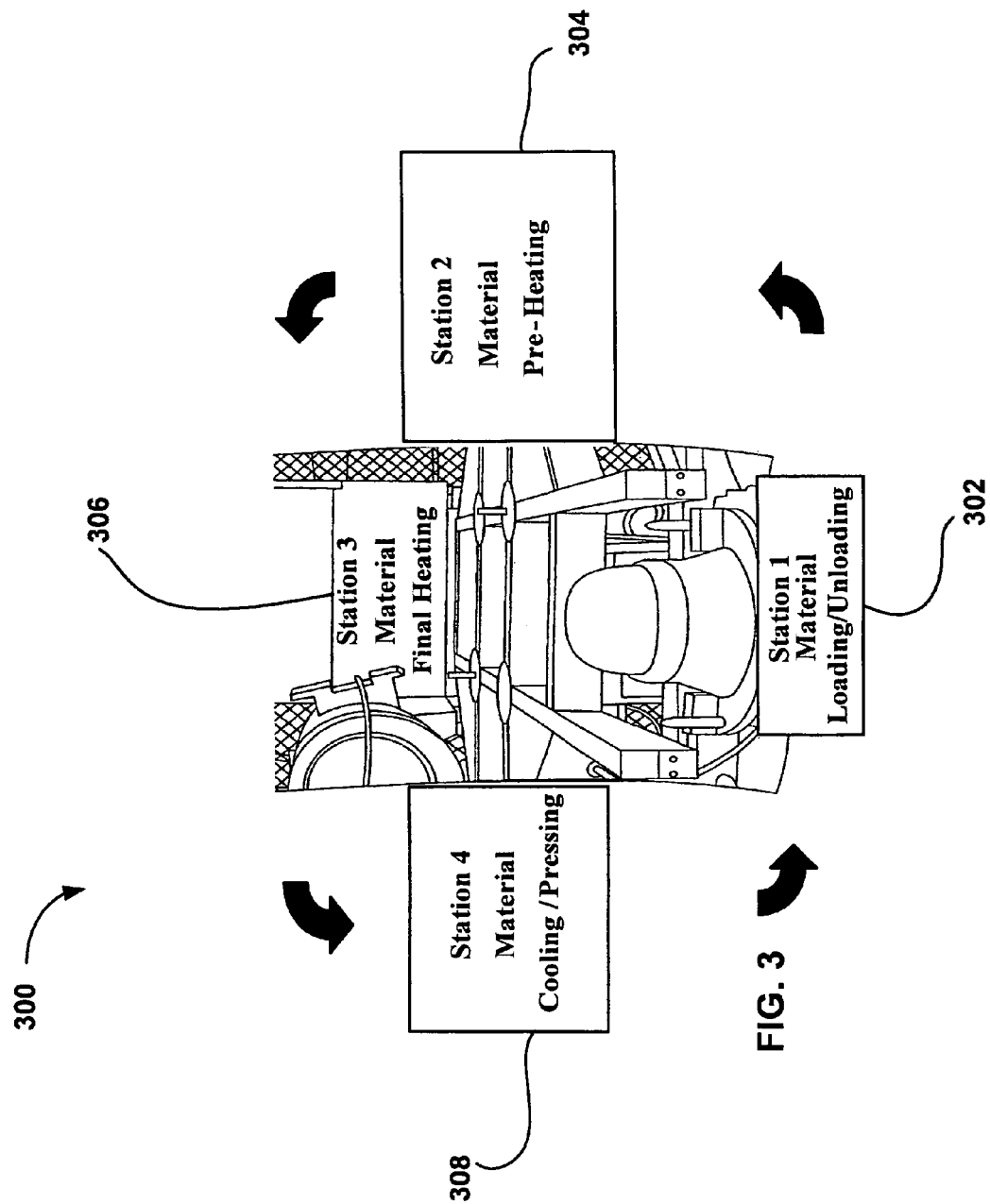
FIG. 3 is a block diagram of a forming device used herein for providing a composite structure.

Regardless of whether the composite material has been pre-formed, the composite material may be further shaped and/or consolidated in a forming device, illustrated in FIG. 3. The forming device 300 may include two or more stations, for example, a first station 302 may provide material loading and/or demolding, a second station 304 may provide preheating and/or application of pressure, a third station 306 may provide heating and/or the application of pressure, and a fourth station 308 may provide material cooling and/or the application of pressure.

Figure 4A:
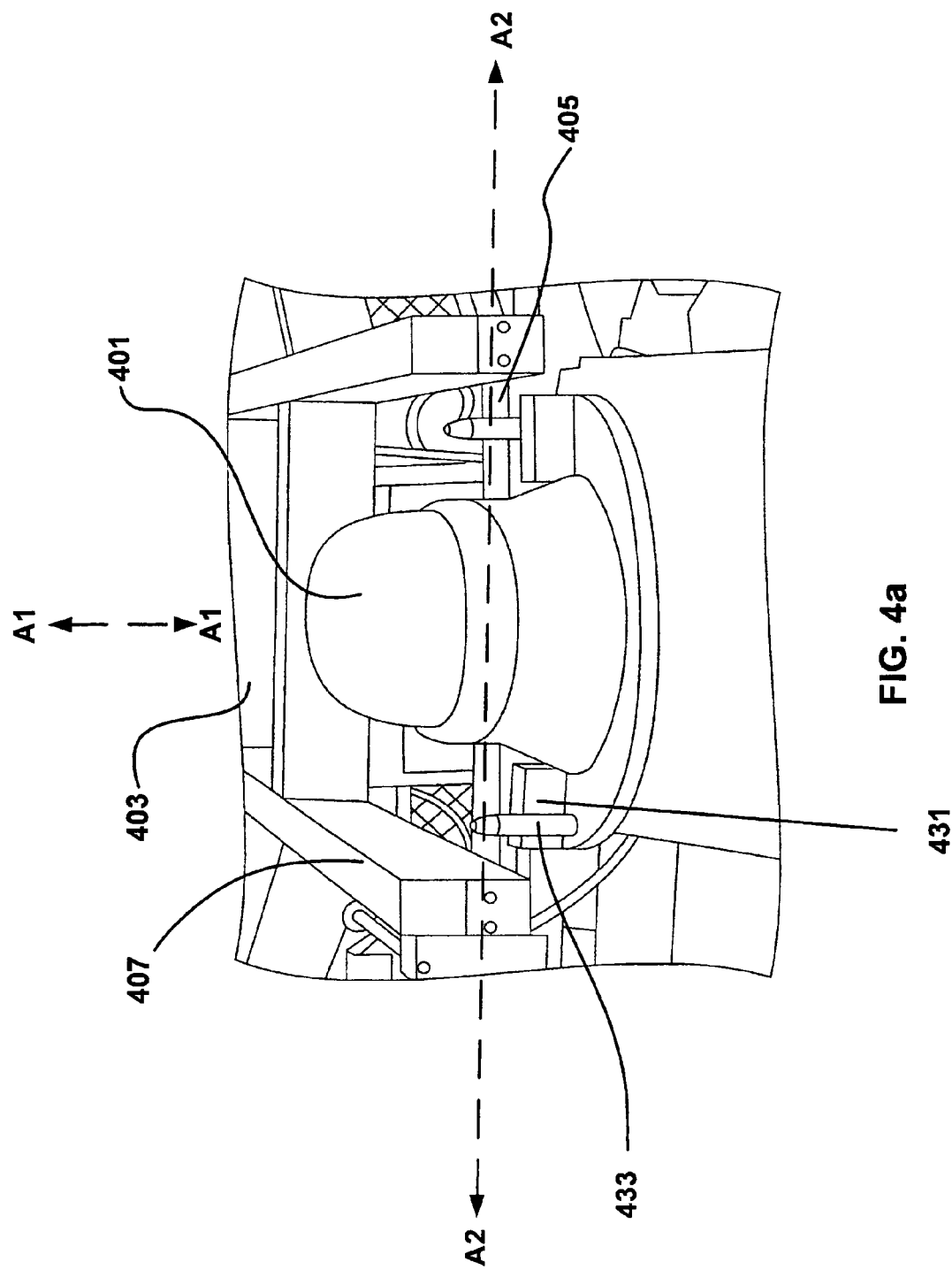
FIGS. 4a through 4f include examples of a mold and transferring a pre-form into a mold.

The forming device may include a first mold half, illustrated in FIG. 4a. As illustrated, the mold half 401 may be convex in shape and in the general shape of a helmet, or other desired structure. The mold 401 may be supported by a rotary transport device 403, which may rotate around a central axis A1. The rotary transport device may include a stationary base and rotary base, rotationally coupled to the stationary base. The rotary base may include a plurality of supports capable of holding a number of mold halves or mold assemblies, which may be mounted on the rotary base. Rotation may be provided for hydraulically, pneumatically and/or mechanically. In one example, the mold 401 may be supported by pins 405 extending from the mold and into arms 407 of the rotary transport device 403, wherein the mold 401 may rotate about the pins 405 around a second axis A2 for loading and unloading pre-forms.

Figure 4B:
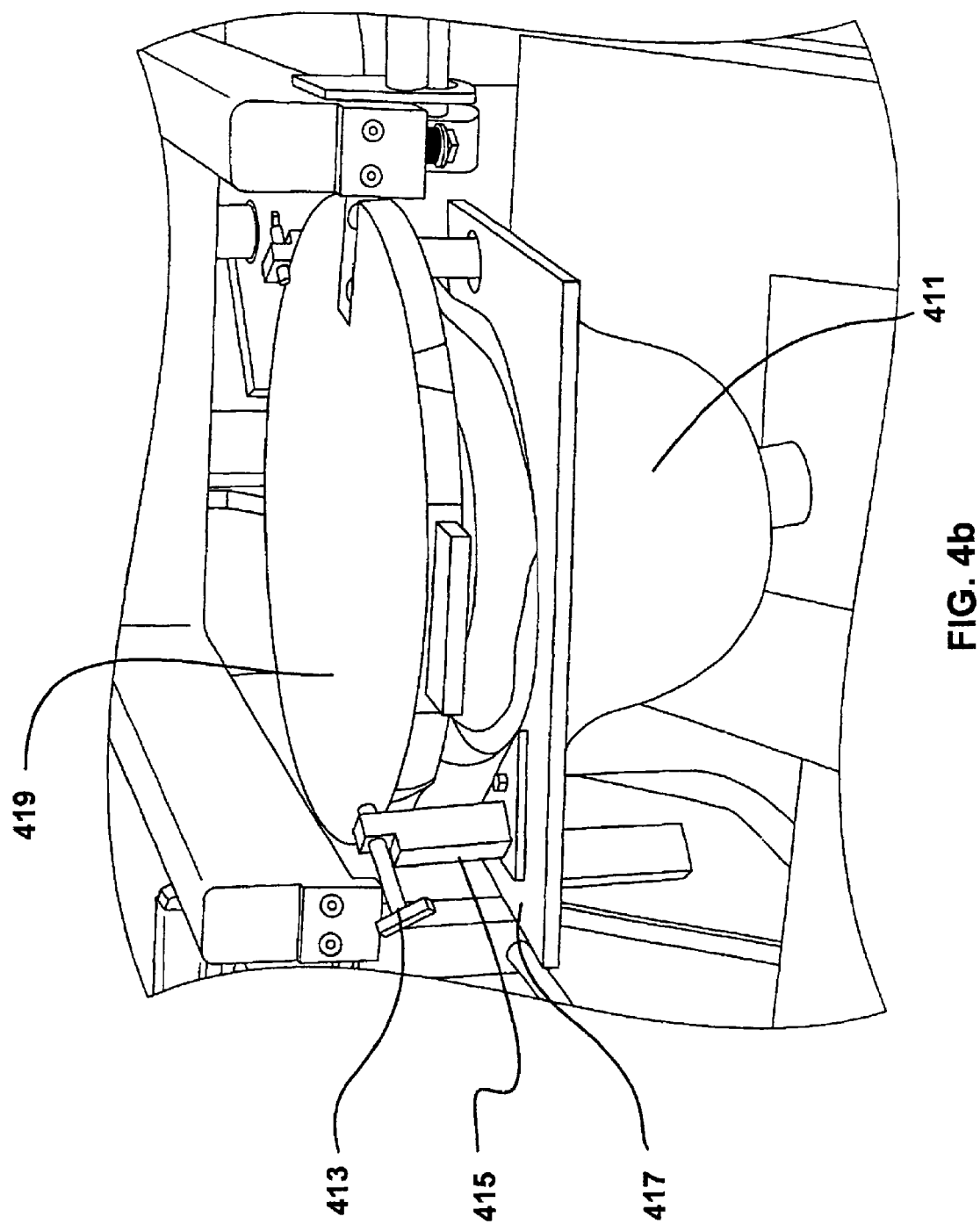

FIG. 4b illustrates a process for loading a composite onto a mold, wherein the mold 401 is rotated into a first position and a carrier tray 411 is positioned proximate to the mold half 401. In one example, as illustrated, the carrier tray 411 may be clamped to the mold 401 by retractable clamping pins 413 affixed to standoffs 415 on the carrier tray 411. It may be appreciated, that other clamping mechanisms may be utilized as well, such as clamping teeth, which may be rotatable about an axis parallel to the base 417 of the carrier tray 411 and received in the mold half, or by screws which may extend through the carrier tray and mold base 419.

Figure 4C:
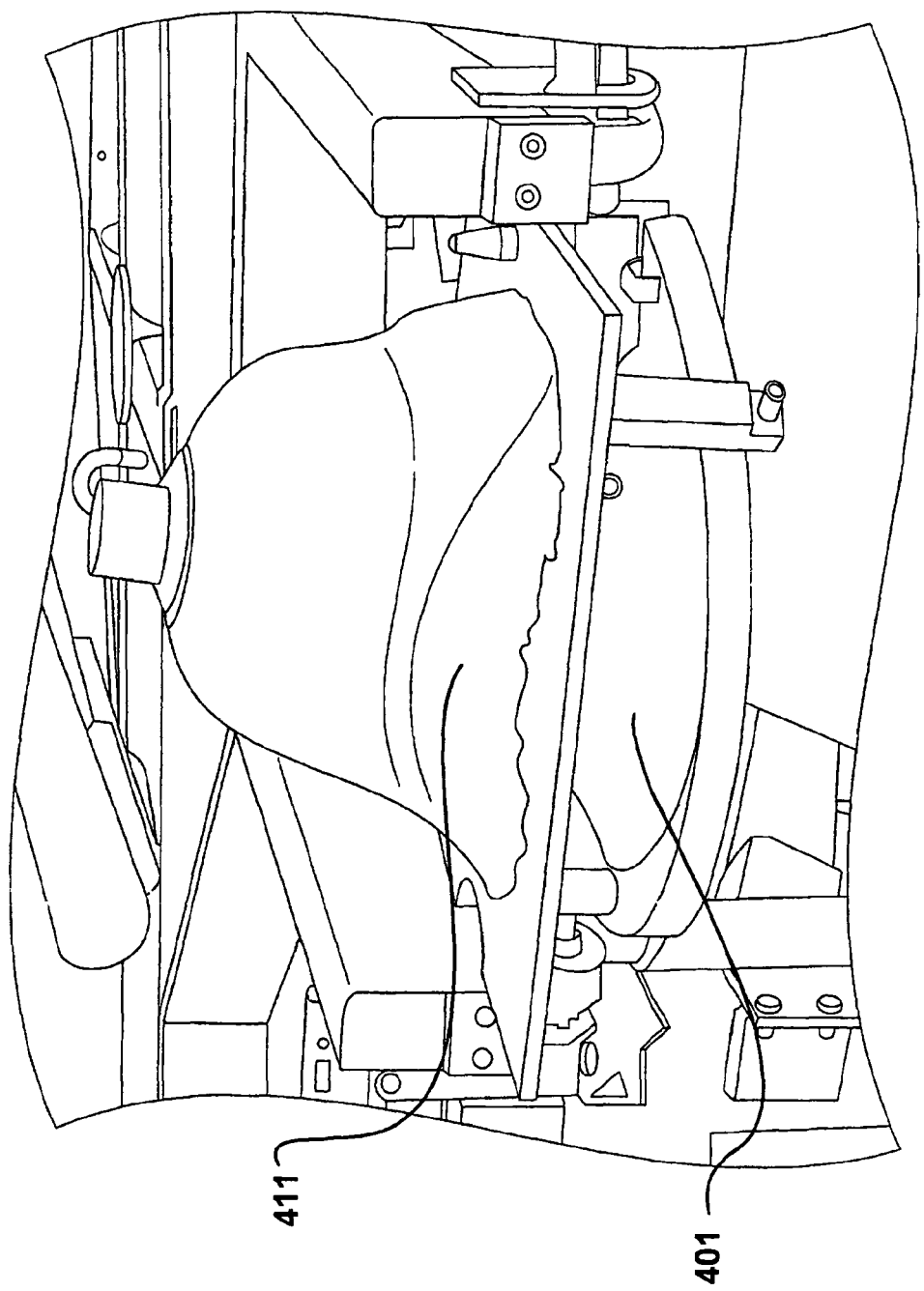
Figure 4D:
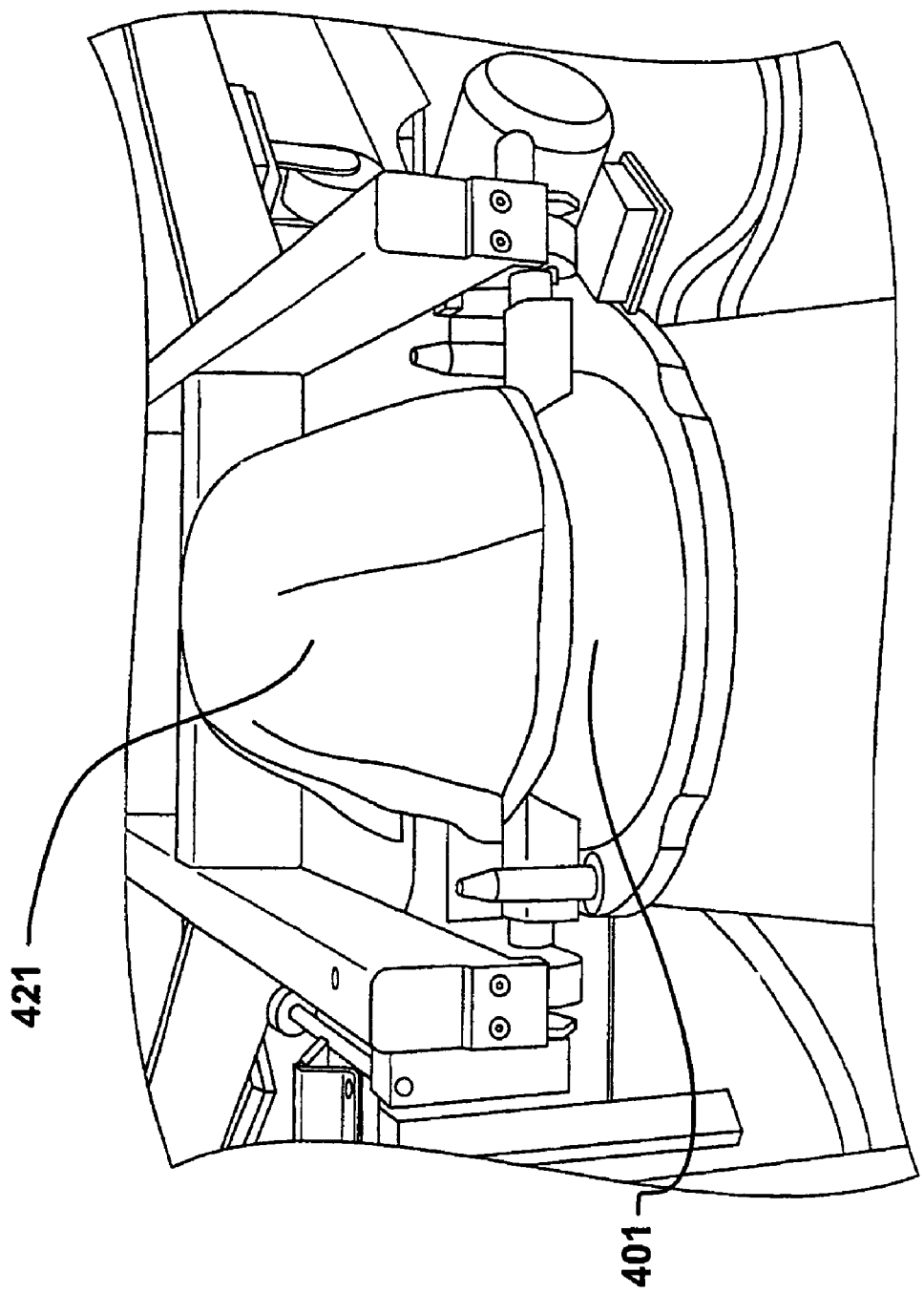

Once the carrier tray 411 is affixed to the mold 401, the mold 401 may be rotated into an upright position, as illustrated in FIG. 4c, to transition the pre-form from the carrier tray 411 to the mold 401. The carrier tray 411 may then be removed from the mold half 401, as illustrated in FIG. 4d, and the pre-form 421 may be retained by the mold half 401. It may be appreciated that other methods of transferring the composite stack to the mold may be contemplated as well, for example, the composite stack may be transferred by hand.

Figure 4E:
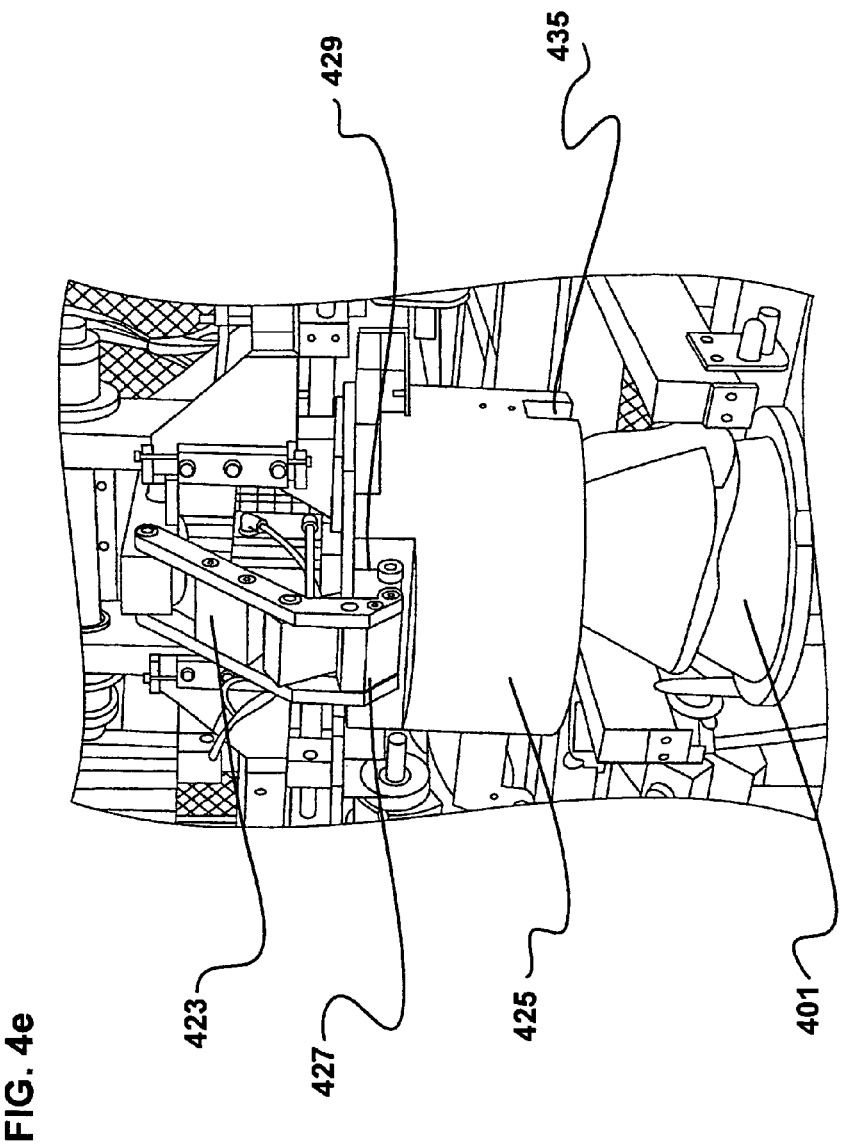

As illustrated in FIG. 4e, a clamping device 423 may be utilized to position a second mold half 425 over the first mold half 401. The clamping device 423 may include a set of jaws 427 which may retain the second mold half 425 by one or more standoffs 429 protruding from the side of the second mold half 425. It may be appreciated that detents may also be provided into the side of the second mold half 425 to receive the teeth of the clamp 423. The clamp 423 may be translated up or down, as well as fore and aft, with respect to the first mold 401.

As may be appreciated, the second mold half may be concave in shape and may receive the first convex shaped mold half. In the example illustrated in FIGS. 4a through 4e, the first mold half may include the details of the inside of a helmet and the second mold half may include the details of the outside of the helmet. However, it may be appreciated that the arrangement may be reversed, i.e., the first mold half may be concave in shape and the second mold half may be convex in shape. In addition, in another example, where the first mold half may be concave in shape, the carrier tray may be eliminated and the stack of composite materials may be inserted into the mold half and a ram press may be used to pre-form the materials in the mold half. Furthermore, as alluded to above, it may be appreciated that other mold shapes may be used as well, for example the molds may be relatively flat or include slight contours, etc., forming plates, manifolds, as well as a variety of other products.

Figure 4F:
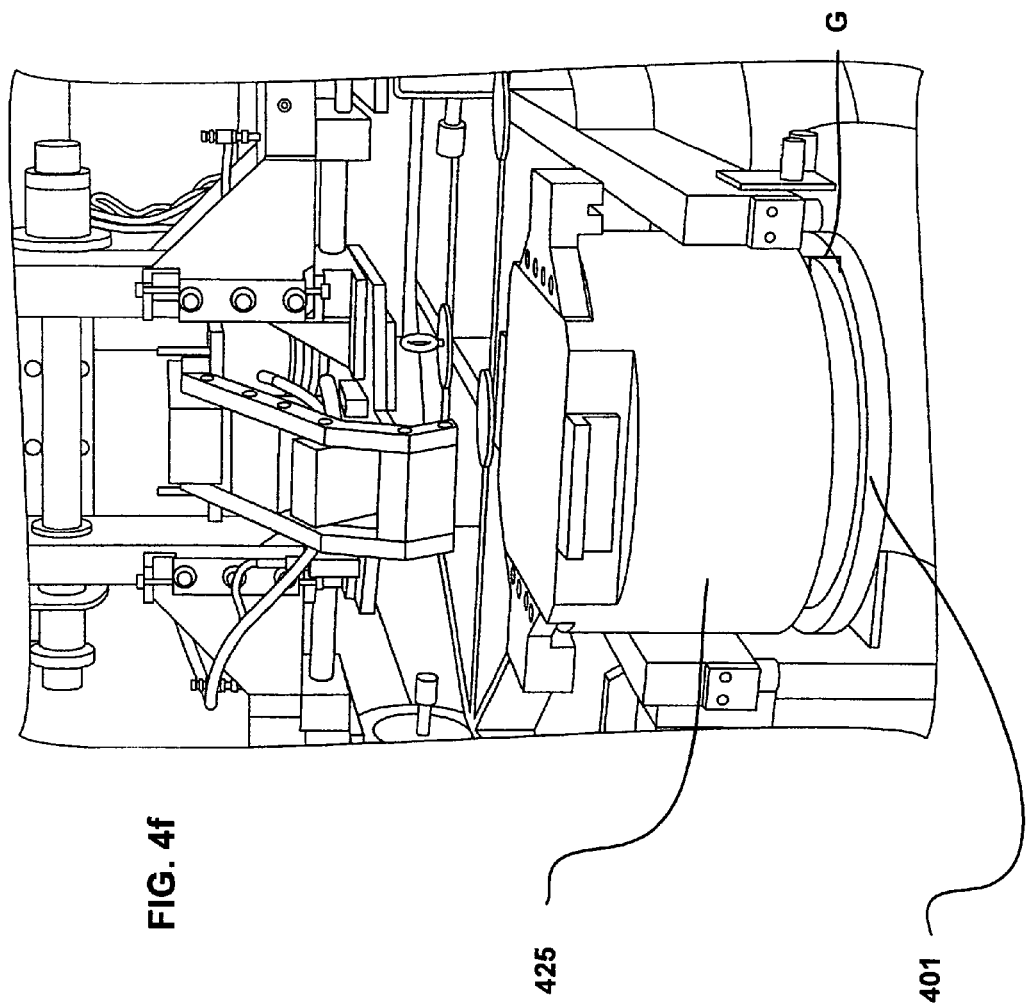

The mold halves may also include a series of locators. The locators may include locating keys 431 and/or locating pins 433, in one mold half as illustrated in FIG. 4a. These keys or pins may be used in conjunction with slots 435, illustrated in FIG. 4e, and/or recesses (not illustrated) for receiving the keys and/or pins that may be provided in the other mold half 425. It may be appreciated that while the keys and locating pins are illustrated in the first mold half 401 and the slots and recess are in the second mold half 425, other arrangements may be contemplated as well. The locators may aid in properly aligning the mold halves 401 and 425, as the mold halves are positioned relative to each other, as illustrated in FIG. 4f, and when pressure is applied during the forming process. It may be appreciated that the second mold half may, to some degree, ride on the composite stack prior to the application of pressure, leaving a gap G between the mold base surfaces.

The molds may be formed of a material which easily conducts thermal energy (i.e., the material may conduct heat or cooling), such as a material that has a thermal conductivity greater than 100 W/(mK), including all values and increments in the range of 175 W/(mK) to 300 W/(mK). Furthermore, the molds may be formed of a material that exhibits a rockwell hardness, i.e., the indentation hardness as measured by ASTM E18-07 or ASTM E18-00, -02, -03, -03e1, -05, -5e1, in the range of HRB 40 to HRB 100, including all values and increments therein. Examples of mold materials may include aluminum or aluminum alloys, copper or copper alloys, conductive ceramics, etc. In addition, relatively hard surface treatments such as nickel, chrome, etc. may be utilized or deposited on the mold surfaces. Furthermore, the locating pins or keys as well as tool holding and containment devices may be formed from relatively hard compositions such as various tooling steels. Such relatively hard materials may include those exhibiting a Rockwell hardness in the range of HRB 60 to HRB 100, including all values and increments therein, or greater, such as in the range of HRC 15 to HRC 40, including all values and increments therein. Therefore, it may be appreciated that the molds may transfer energy in the form of thermal energy (including heat or cooling) and/or pressure to the composite.

Figure 5:
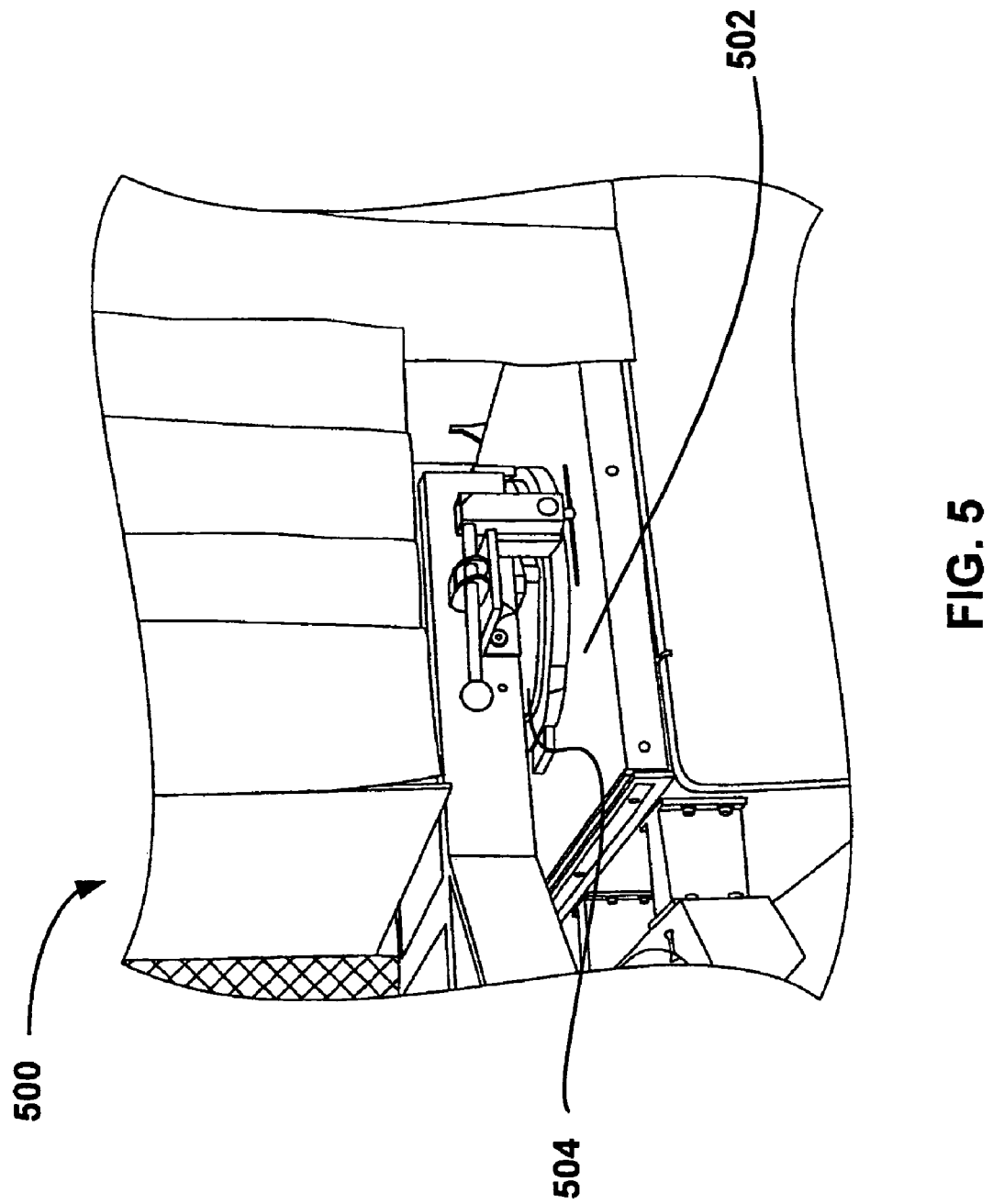
FIG. 5 is an example of a preheating or heating press.

Referring back to FIG. 3, once a composite stack is loaded into the mold, the rotary transfer station may optionally transfer the assembled mold halves to a preheat press 304. FIG. 5 illustrates an example of a preheat press. The preheat press 500 may include a set of platens 502 (the lower of which is visible in the figure), which may receive the mold halves 504 and may conduct heat and/or pressure to the mold halves. Preheating may occur for a set time period $t_{preheat}$ at a given temperature set point $T_{preheat}$ or until the given temperature set point $T_{preheat}$ is reached by at least one of the mold halves or the composite material itself. In addition the press may apply pressure to the composite during the preheating stage at a second pressure $P_{preheat}$. The pressure may be applied hydraulically, pneumatically, electrically and/or mechanically by the press and may be measured by pressure or applied due to the maintenance of a given distance between the mold halves or platens. For example, the press may be pneumatic or hydraulic and include one or more pressurized rams which may drive one or more of the platens up and/or down. In another example, a series of gears may provide upward and downward movement of one or more platens. As may be appreciated, preheat time or temperature may be dependent on the mold materials, the mold mass, the composite materials, etc. After the mold halves and/or composite have been preheated, the mold may be transferred to a heating press.

Similar to the preheat press illustrated in FIG. 5, the heating press may include a set of platens, which may receive the assembled mold halves and conduct heat and/or pressure to the mold halves. Once again, the platens may include heating elements such as resistive heaters or channels for a heated fluid, such as water or oil. Heating may occur for a given time period $t_{heating}$ at a given temperature $T_{heating}$ or until the mold halves or composite material reaches the given temperature $T_{heating}$. Pressure $P_{heating}$ may be applied to the heating platens pneumatically, hydraulically, electrically and/or mechanically and the press may be constructed similar to the preheating press described above. Once again, the actual heating temperatures and pressures may be dependent on the mold material, mold mass, composite material, composite mass, etc.

To improve heating during the preheat or heating portion of the molding cycle, one or more removable cores may be inserted into the mold halves. For example, a core including heating elements may be presented in a hollowed portion of the convex mold half, or in recesses presented around the concave mold half. Cores may be positionable within the mold halves via hydraulics or pneumatics, which may raise the cores from underneath the platen surface or lower the cores into the platen surface. Thus, it may be appreciated that the introduction and/or removal of the cores may allow for movement of mold between the platens without hindrance, which may otherwise be caused by projections on the platen surfaces.

Figure 6:
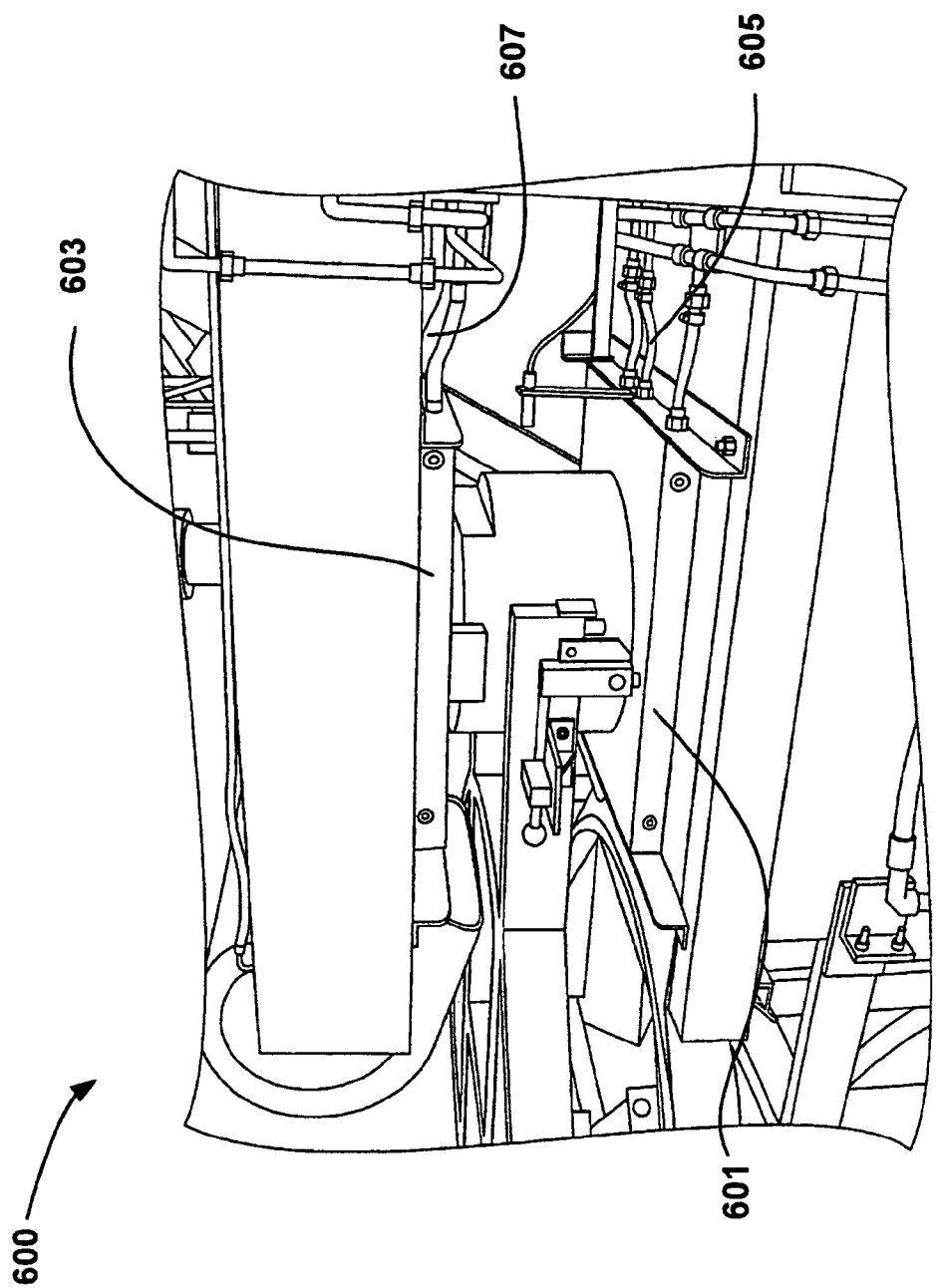
FIG. 6 is an example of a cooling press.

Once the composite has been heated, the composite may be cooled by transferring the mold halves to a third press, illustrated in FIG. 6. The third press 600 may include a third set of platens 601, 603 including cooling elements 605, 607. The cooling elements may include, for example, channels for transporting a fluid or gas, such as water, to remove heat from the tool. Cooling may be applied to the composite for a given time period $t_{cooling}$ at a given temperature at $T_{cooling}$ and/or until the mold or composite reaches the given temperature $T_{cooling}$. Similar to the above, the platens of the cooling press may be powered by a number of sources such as hydraulic, pneumatic, electric and/or mechanical and similar in construction to the presses described above and pressure $P_{cooling}$ may be applied to the composite structure during cooling. Once again, it may be appreciated that the temperatures and pressure utilized herein may depend upon the materials being consolidated and/or formed.

Figure 7:
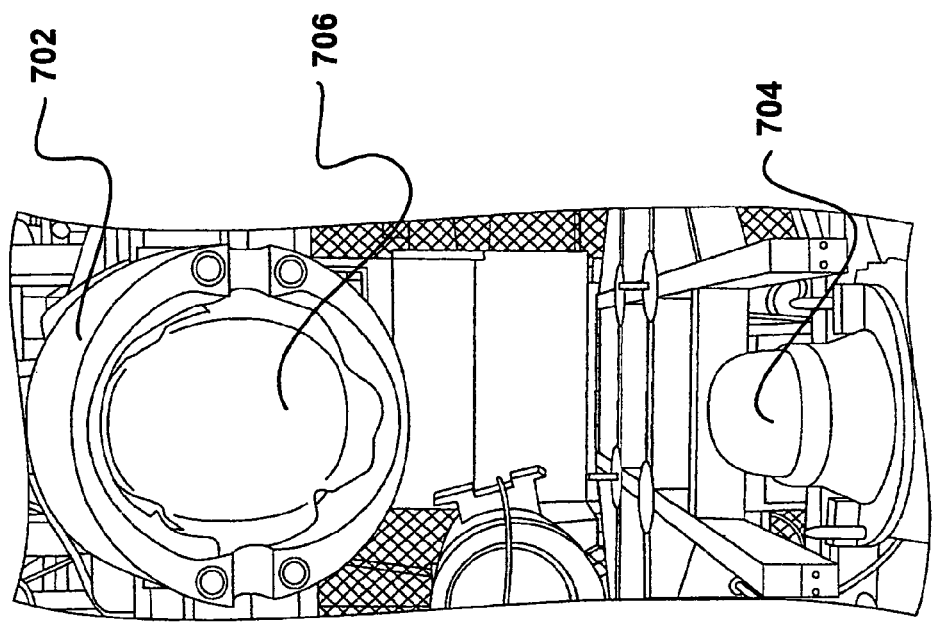
FIG. 7 is an example of a composite to be removed from a mold half.

Once cooling is complete, the rotary transfer station may transfer the mold to the loading/demolding station. As illustrated in FIG. 7, the second mold half 702 may be removed from the first mold half 704 using the clamping device illustrated in FIG. 4e. The consolidated or formed composite 706 may then be demolded by a demolding tool for demolding the composite from one of said first and second mold halves. In one example, the demolding tool may include at least one gripper. The gripper may be pneumatically actuated and grab the molded part in slotted areas provided in the mold, pulling the part out by pushing against the mold itself. It may be appreciated, that the formed composite 706 may also be demolded by hand.

In one example, the preheat temperature $T_{preheat}$ may be less than the heating temperature $T_{heating}$, wherein $T_{preheat} < T_{heating}$. In addition, the cooling temperature $T_{cooling}$ may be less than the preheat temperature and the heating temperature, $T_{cooling} < T_{heating}$, $T_{cooling} < T_{preheat}$. The initial temperature $T_{initial}$ may also be less than the preheat temperature $T_{preheat}$, wherein $T_{initial} < T_{preheat}$. Furthermore, the initial temperature $T_{initial}$ may be greater than the cooling temperature $T_{cooling}$, wherein $T_{initial}>T_{cooling}$. However, it may be appreciated that other temperature profiles may be contemplated, such as where the initial temperature may be less than the cooling temperature $T_{cooling}$, wherein $T_{initial}<T_{cooling}$. In some examples, such profile differences may arise depending on where the temperature is measured, either in the mold or in the composite.

In another example, the preheat pressure $P_{preheat}$ may be less than the heating pressure $P_{heating}$, wherein $P_{preheat}<P_{heating}$. In addition, the heating pressure $P_{heating}$ may be less than the pressure applied during cooling, $P_{cooling}$, wherein $P_{heating}<P_{cooling}$. Furthermore, the initial pressure $P_{initial}$ applied during initial packing of the layers into the preforming carrier may be less than the pressure applied during the preheat stage, wherein $P_{initial}<P_{preheat}$. Accordingly, it may be appreciated that in some examples, the cooling pressure $P_{cooling}$ may be the highest pressure applied to the composite material during forming. In addition, it may be appreciated that in some examples the pressure applied during preheating $P_{preheat}$ may be greater than the pressure applied during heating $P_{heating}$, wherein $P_{preheat}>P_{heating}$, or the initial pressure $P_{initial}$ may be greater that the preheating or heating pressure, wherein $P_{initial}>P_{preheat}$, $P_{initial}>P_{heating}$.

Figure 8:
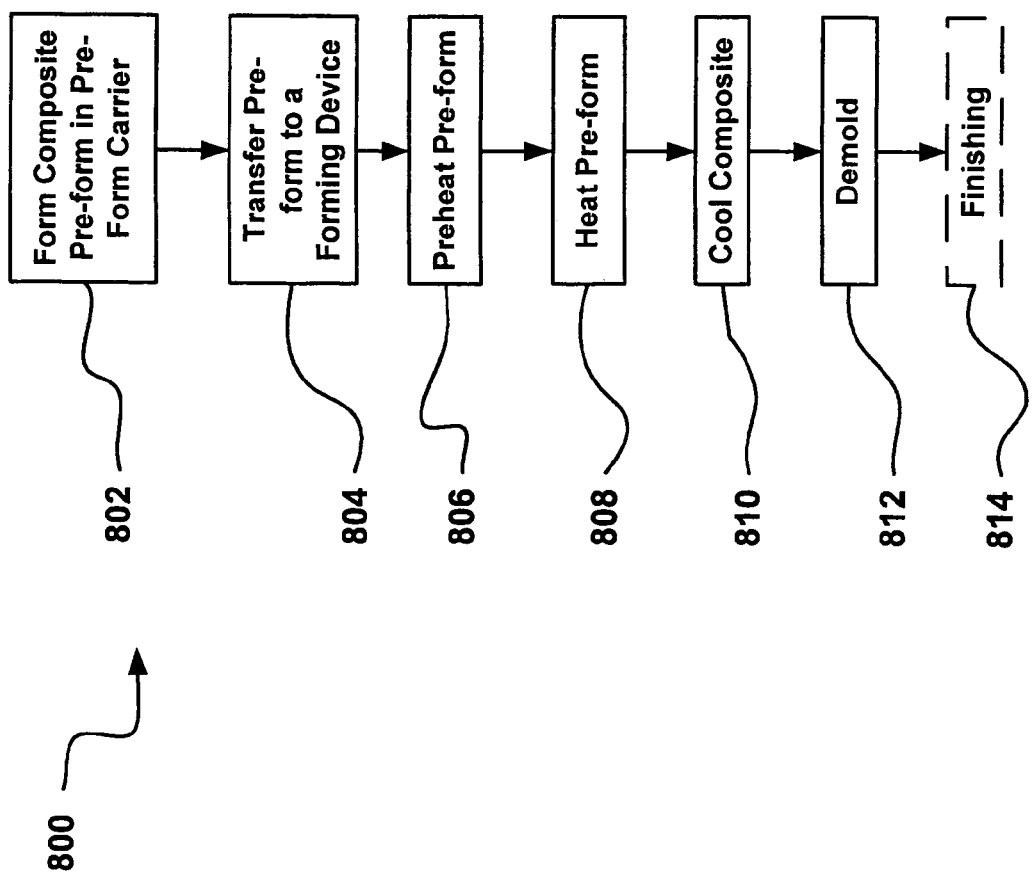
FIG. 8 is an example of a flow diagram of a process for forming a composite.

One example of a process 800 contemplated herein is illustrated in FIG. 8. A composite pre-form may be formed in a pre-forming carrier using an initial pressure $P_{initial}$, over an initial time period $t_{initial}$, and at an initial temperature $T_{initial}$, at 802. The pre-form may then be transferred to the forming device and loaded onto the forming mold, at 804. The pre-form may be transferred to a preheat press and a first pressure $P_{preheat}$ (or pressure profile) may be applied to the pre-form while heating to or at a first temperature $T_{preheat}$ (or temperature profile) for a first time period $t_{preheat}$ at 806.

Once preheated, the pre-form may be transferred from the loading station to a heating station, at 808, and the pre-form may be heated to or at a second temperature $T_{heating}$ (or temperature profile) and a second pressure $P_{heating}$ (or pressure profile) may be applied to the pre-form for a second time period $t_{heating}$. Then the pre-form may be transferred to a cooling station, at 810, and the pre-form may be cooled to or at a third temperature $T_{cooling}$ (or temperature profile) and a third pressure $P_{cooling}$ (or pressure profile) for a third time period $t_{cooling}$. Once the pre-form has been consolidated and/or formed into the composite it may be demolded at 812, the composite part may be trimmed and/or otherwise finished at 814.

It may be appreciated that in the above process, the highest pressure may be applied during cooling, wherein $P_{cooling}>P_{heating}$, $P_{cooling}>P_{preheat}$, $P_{cooling}>P_{initial}$. In addition, in one example, $P_{cooling}>P_{heating}>P_{preheat}>P_{initial}$. Furthermore, the highest temperature may be applied during the heating step, wherein $T_{heating}>T_{cooling}$, $T_{heating}>T_{preheat}$, $T_{heating}>T_{initial}$. In one example, $T_{heating}>T_{preheat}>T_{initial}>T_{cooling}$ or, in another example, $T_{heating}>T_{preheat}>T_{cooling}>T_{initial}$.

As may be appreciated, the temperatures and/or pressures may be measured by inserting a thermocouple into one of the mold halves and/or into the composite or a platen. In another example, infrared temperature measurement may be utilized to gauge the temperature of the molding tools and/or substrates. The measured temperature may be provided as a signal to a control unit, which may increase or decrease the output on the heating and/or cooling elements to obtain a specific set point. Similarly, a pressure sensor may be utilized in the mold halves or in the presses to regulate pressure. The sensor may provide a signal to a controller which may regulate the pressure applied to the composite by regulating various valves or pressure releases.

In another example, more than one set of mold halves may be transferred through the system at a given time. For example, while a first set of mold halves may be loaded and unloaded, a second set of mold halves may be preheated, while a third set of mold halves may be heated and a fourth set of mold halves may be cooled. Thus it may be appreciated that one or more sets of mold halves may be present at a given time, including all values and increments in the range of 1 to 8. In addition, it may be appreciated that a single composite structure may be transferred through the entire forming/consolidating process by a single set of mold halves.

Figure 9:
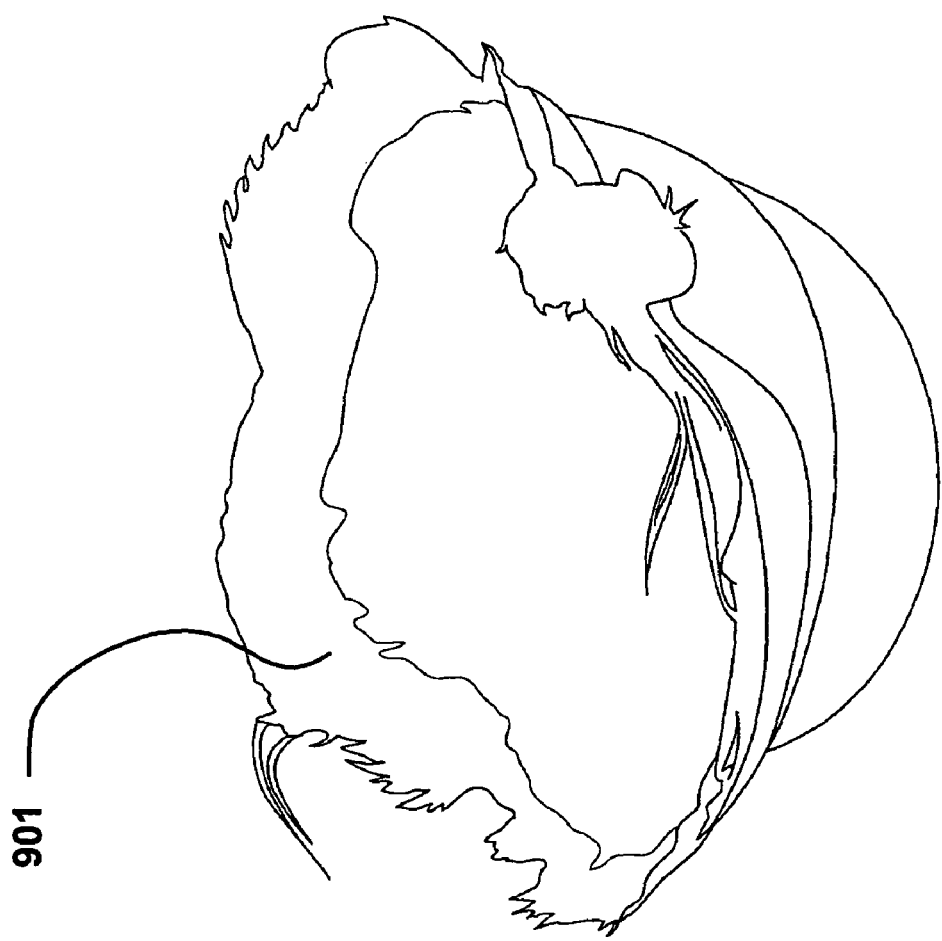
FIG. 9 is an example of a composite at a near net shape.

It may also be appreciated that once removed from the mold halves, the part may be at in a near net shape, as illustrated in FIG. 9. In other words, most of the final composite geometry may be present except for the finished shape of the part rim or edges 901. In the case of a helmet, for example, the geometry of the upper portion of the helmet may be relatively completely formed or shaped. However, the edges of the part may be trimmed to form a finished part and therefore, a single mold may accommodate a number of helmet designs, which may be altered by the trimming process. It may be appreciated that trimming may be performed for other parts as well. For example, where a ballistic vest insert may be contemplated, the insert may be trimmed depending on the length or style of the ballistic vest.

Figure 10:
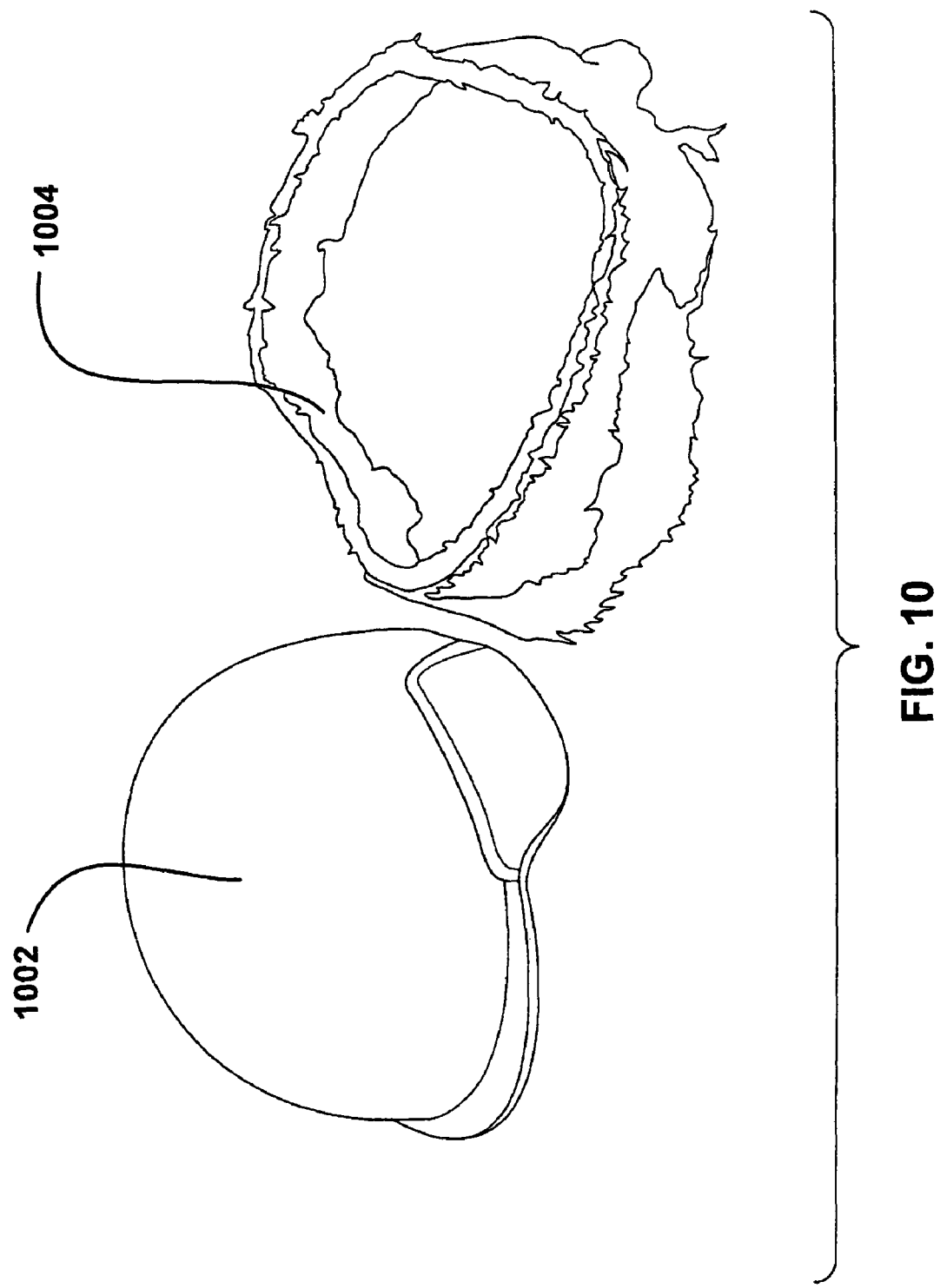
FIG. 10 is an example of a composite at its net shape.

The composite part may be trimmed by a cutting tool. In one example, the cutting tool may include a CNC machine or lathe capable of moving the composite or cutting tool in three or more axes. The cutting tool may include a fixture for retaining and/or positioning the composite. In addition, the cutting tool may be configured to deliver a compressed gas, such as liquid carbon dioxide to the cutting region. The gas may be delivered by a nozzle configured to direct the compressed gas proximate to the cutting tool and/or composite. The gas may be regulated to maintain the temperature of the tool and/or composite, such as with a thermocouple. Further detail as to an example of a cutting tool may be found in U.S. Provisional Patent Application No. 61/041,221, filed on Mar. 31, 2008, the subject matter of which is incorporated herein by reference. In addition, other cutting tools may be utilized as well. After trimming, the composite 1002 may assume its net or finished shape, illustrated in FIG. 10, and the trimmed edge 1004 may be separated from the composite 1002.

The entire process for forming a helmet may take a several minutes, such as between 2 to 40 minutes, including all values and increments therein, but given the separation of the process elements such as preheating, heating cooling/pressing and demolding, a composite article may be produced in the forming device every few minutes, such as between 2 and 10 minutes. It may be appreciated that such cycle time may realize an advantage over other forming/molding processes, which may, in some examples, take as long as one or two hours.

In addition, the products produced herein may exhibit improvements in small grain ballistic performance over products made in a compression molding type process due to the differences in level of consolidation that this process introduces to the composite parts. The $V_{50}$ may be measured by $V_{50}$ ballistic testing methodology, which may be understood as the velocity at which 50% of a given grain fragment (in the present case a 17 grain FSP steel fragment) fired may pass through or penetrate a substrate, such as described in MIL STD-662F $V_{50}$ (1997).

An example of a composite structure, which may be produced by the machine, system and/or process described herein may include a one or more layers of a fabric and/or film. The fabric may be made of reinforcing fibers, while the film may be made of a thermoplastic material. For example, a first fabric may be formed of fibers having a tenacity, i.e., the force exerted per unit linear density when tensile stress is applied, in the range of 1.5 N/tex to 4.0 N/tex (newtons per tex), including all values and increments therein, such as 2.00 N/tex to 3.60 N/tex. An example of such fibers may include aramid fibers, including para-aramid fibers such as KEVLAR, available from DuPont or ultra high molecular weight polyethylene, such as DYNEEMA, available from DSM. The film coupled with such fabric may have a melting point in the range of 120° C. to 170° C., including all values and increments therein. An example of such film may include a polyolefin based film attached to the fabric via a lamination process. A second fabric, which may also be included in a composite structure, may be formed of carbon fibers, including PAN based or rayon based carbon fibers. In addition, various adhesives may be utilized between one or more layers of the composite material.

In one example, multiple layers of a single material may be oriented in various directions and consolidated together to form a core material, which may be inserted and/or adhered into a skin material. The skin material may be molded in the process described herein or by another molding process, such as injection molding, compression molding, thermoforming, etc. In another example, multiple layers of a core material may be positioned in one or more layers of skin material or between two or more layers of skin material. A layer of adhesive may be positioned between the skin material and the core material or an adhesive fiber may be stitched into the skin material.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method of forming a composite, comprising:
   placing a composite between a first mold half and a second mold half;
   heating said composite in a preheat press at a preheat temperature, $T_{preheat}$, and holding said composite at a preheat pressure, $P_{preheat}$, wherein said preheat pressure is applied to said composite through said first and second mold halves;
   transferring said composite to a heating station and heating said composite at a heating temperature $T_{heating}$ and a heating pressure $P_{heating}$;
   transferring said composite to a cooling station and cooling said composite at a cooling temperature, $T_{cooling}$, and holding said composite at a cooling pressure, $P_{cooling}$, wherein said cooling pressure is applied to said composite through said first and second mold halves, wherein $T_{heating} > T_{preheat} > T_{cooling}$ and $P_{preheat} < P_{heating} < P_{cooling}$; and
   removing said composite from said first and second mold halves, wherein said composite has a near-net shape.

2. The method of claim 1, further comprising trimming said composite to a net shape.

3. The method of claim 1, further comprising providing various layers to form said composite in a pre form carrier and applying an initial pressure $P_{initial}$ and an initial temperature $T_{initial}$ to said composite; and transferring said composite from said carrier to said first mold half.

4. The method of claim 1, wherein said composite is a helmet.

5. The method of claim 1, wherein said composite comprises a plurality of thermoplastic material layers and a binder disposed between at least a portion of said layers.

6. The method of claim 1, wherein said first and second mold halves are formed of a material having a thermal conductivity greater than 100 W/(mK) and a hardness in the range of HRB 40 to HRB 100.

* * * * *

UNITED STATES PATENT AND TRADEMARK OFFICE
CERTIFICATE OF CORRECTION

| | | |
|---|---|---|
| PATENT NO. | : 8,071,008 B1 | Page 1 of 1 |
| APPLICATION NO. | : 12/413127 | |
| DATED | : December 6, 2011 | |
| INVENTOR(S) | : Vasilios Brachos et al. | |

It is certified that error appears in the above-identified patent and that said Letters Patent is hereby corrected as shown below:

In column 10, line 25, in Claim 3, delete "pre form" and insert -- pre-form --, therefore.

Signed and Sealed this
Seventh Day of February, 2012

David J. Kappos
*Director of the United States Patent and Trademark Office*